United States Patent
Bannister et al.

(10) Patent No.: US 9,508,028 B2
(45) Date of Patent: Nov. 29, 2016

(54) CONVERTING TEXT STRINGS INTO NUMBER STRINGS, SUCH AS VIA A TOUCHSCREEN INPUT

(71) Applicant: Nuance Communications, Inc., Burlington, MA (US)

(72) Inventors: Wendy Bannister, Burlington, MA (US); Simon Corston, Newminster (CA)

(73) Assignee: Nuance Communications, Inc., Burlington, MA (US)

( * ) Notice: Subject to any disclaimer, the term of this patent is extended or adjusted under 35 U.S.C. 154(b) by 142 days.

(21) Appl. No.: 14/495,741

(22) Filed: Sep. 24, 2014

(65) Prior Publication Data
US 2016/0085726 A1   Mar. 24, 2016

(51) Int. Cl.
*G06K 9/00* (2006.01)
*G06K 9/72* (2006.01)
*G06F 17/30* (2006.01)
*G06F 3/0488* (2013.01)
*G06F 17/27* (2006.01)

(52) U.S. Cl.
CPC .............. *G06K 9/72* (2013.01); *G06F 3/0488* (2013.01); *G06F 3/04886* (2013.01); *G06F 17/276* (2013.01); *G06F 17/2765* (2013.01); *G06F 17/30448* (2013.01)

(58) Field of Classification Search
None
See application file for complete search history.

(56) References Cited

U.S. PATENT DOCUMENTS

| | | | | |
|---|---|---|---|---|
| 7,707,496 B1* | 4/2010 | Moore | ............... | G06F 17/2264 715/254 |
| 2011/0029862 A1* | 2/2011 | Scott | ................ | G06F 3/0237 715/261 |
| 2011/0074692 A1* | 3/2011 | Causey | ............... | G06F 3/0216 345/169 |
| 2012/0078627 A1* | 3/2012 | Wagner | ................ | G06F 17/273 704/235 |
| 2013/0285916 A1* | 10/2013 | Griffin | ................ | G06F 3/0237 345/169 |

* cited by examiner

*Primary Examiner* — Stephen R Koziol
*Assistant Examiner* — Delomia L Gilliard
(74) *Attorney, Agent, or Firm* — Perkins Coie LLP

(57) ABSTRACT

System and methods are provided for detecting numerical text strings within a text string and converting those numerical text strings into digit strings. The digit strings may be reflected in real-time, such as when the user is typing a text message. If more than one possible format of the digit string is determined, the system may then provide a selection of the various formats for selection. Once the proper format for the digit string is determined, that digit string may replace the numerical string previously detected in the text string. The text to digit conversion and associated formatting expedites user text entry such that the user is not required to switch keyboard views, (e.g., virtual keyboards). Additionally, converting to digit strings compresses message length, as well as provide other benefits.

20 Claims, 5 Drawing Sheets

CONVERTING TEXT STRINGS INTO NUMBER STRINGS, SUCH AS VIA A TOUCHSCREEN INPUT

BACKGROUND

In today's digital world, electronic communication is fast becoming the go-to method. Though users have cellular telephones, short message service (SMS), or text messaging is more commonly used. Users can quickly communicate with others and keep a log of the communication. With the emergence of smartphones, tablets, hybrid devices (e.g., mini tablets), and other mobile devices—with the integration of touch interface technology onto computers—users are capable of providing inputs to those computing device through an additional input element: touchscreens. Touchscreen displays are now an industry standard on cellular telephones, tablets, laptops and even some desktop computers.

A touchscreen allows users to combine the functions of various traditional input elements, e.g., a traditional mouse and keyboard, into one. In order provide this functionality, the touchscreen often displays a virtual keyboard to users when keyed entries are required. The displayed keyboard is generated either automatically by an application or at the user's request. Because of the size of the device on which they are incorporated, displayed virtual keyboards often include input keys that are a fraction of the size of keys on traditional keyboards.

So, in order to provide the same functionality of a keyboard, numerous keyboard views are needed. The user can simply press a button on each keyboard view to display an alternate view. Most common virtual keyboards include numbers and symbols on alternate views, incorporating only the most commonly used symbols, e.g., period, question mark, etc., on the primary keyboard view. However, as devices decrease in size it becomes increasingly difficult for users to properly and quickly input text on the correspondingly smaller keyboards. In order to enter text a user views one keyboard and in order to enter numbers and symbols a user must switch to another keyboard view. Likewise, in keypad based mobile devices, users are required to press and hold or complete numerous presses to get to a particular number or symbol. Such a process is time consuming, which contradicts the common goal of most users composing the text message or email: to communicate as rapidly and efficiently as possible.

Therefore, the need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
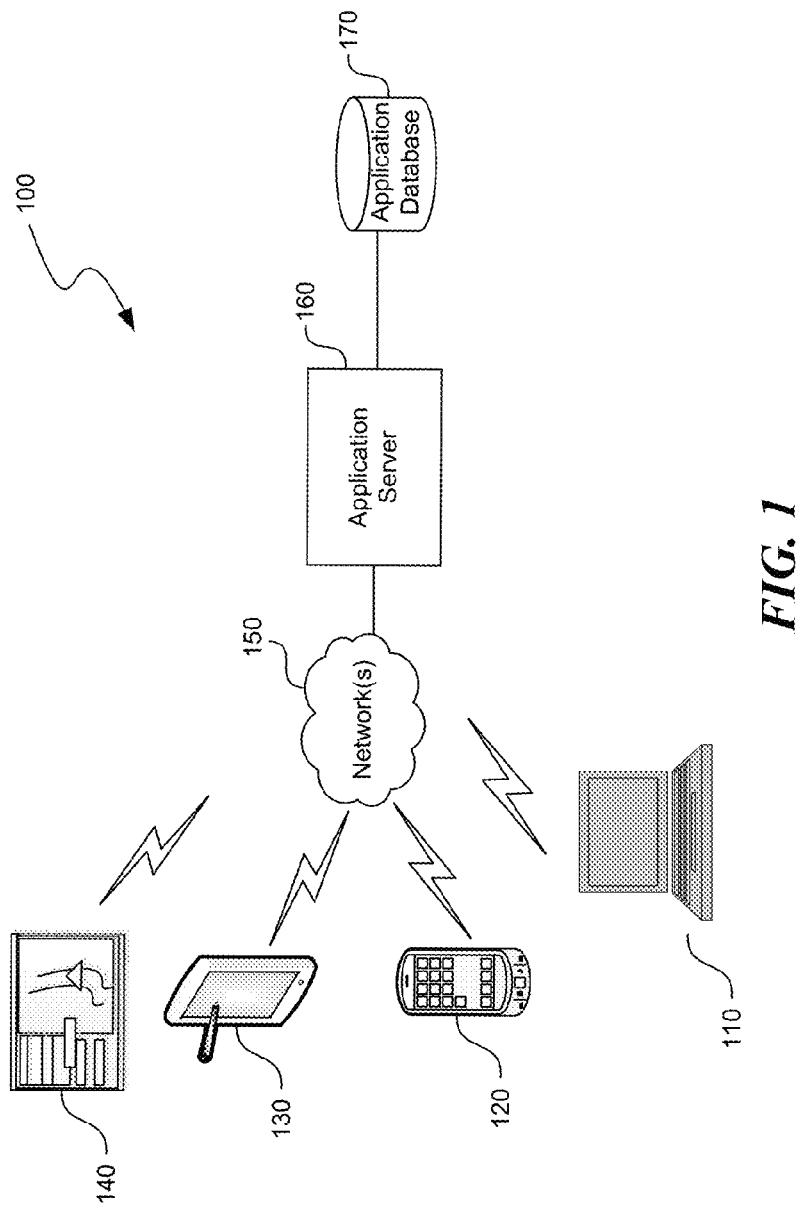
FIG. 1 illustrates an example of a computing network in which some embodiments of the present invention may be implemented.

A system and methods are provided for formatting digit strings from text. Specifically, the present system and methods allow for receiving numerical text strings and converting that text into formatted digit strings. The system and methods may be implemented on a mobile device, such as a device where text messaging (e.g., SMS) is commonly utilized. For purposes of this description, a digit string is any string in which a number is represented in a digit format, including punctuation, such as colons, semi-colons, periods, dollar signs (or other monetary identifiers), dashes, slashes, etc. Text strings may include any words, or other text input including numerical words which may be entered by a user on an input device coupled to a computing device.

The methods implemented by the system include analyzing a text string for numerical word strings, or number words, and properly formatting the number words into digit strings. (The terms "numerical word", "numerical word string," "number word," "numerical text" and the like are generally used interchangeably herein.) As discussed in the following embodiments, the methods may be implemented in a digit formatting application, which may include various stand-alone or sub-processes for performing specific tasks. For example, to analyze the text string, the system may implement one or more methods using string searching or matching, and one or more string functions to modify the text string once a numerical word string is detected. Once the system determines that a textual word entry contains a numerical word, that text string may further be searched (or parsed) for additional numerical words and/or keywords which indicate a particular format in which the numerical words is to be converted (e.g. into a digit string formatted as a phone number in the form "(xxx) yyy-zzzz").

Accordingly, to properly format the digit strings, the system also analyzes the text string in which the number words are detected based on a set of criteria. For example, one criteria includes the language and corresponding country in which the text string is entered. A second criteria is evaluating the context (if any) in which the numerical string is used. To evaluate the context, the system may determine if any keywords or phrases are utilized in the string adjacent to near the number word. For example, if the user enters "an account balance of . . . " or "my number is . . . " then the system can determine the type of formatting for the detected numerical string. The context evaluation can be implemented in methods including one or more rules, e.g., "if, then" statements.

Numerous formatting types may be included, based on language and associated country, for converting the numerical word string into a digit string. For example, if not based on context, the numerical word string may be offered in the most commonly used formats, such as monetary, time, dates, etc. However, given a particular context, the digit string may be predictively and correctively formatted.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Without limiting the scope of this detailed description, examples of systems, apparatus, methods and their related results according to the embodiments of the present disclosure are given below. Unless otherwise defined, all technical and scientific terms used herein have the same meaning as commonly understood by one of ordinary skill in the art to which this disclosure pertains. In the case of conflict, the present document, including definitions will control. The terms used in this detailed description generally have their ordinary meanings in the art, within the context of the disclosure, and in the specific context where each term is used. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirement for some embodiments but not for other embodiments.

I. System

The discussion herein provides a brief, general description of a suitable computing environment in which aspects of the present invention may be implemented. Although not required, aspects of the system are described in the general context of computer-executable instructions, such as routines executed by a general-purpose computer, e.g., mobile device such as a smartphone, tablet, notebook or laptop computer, a server computer, or personal computer. Those skilled in the relevant art will appreciate that the system may be practiced with other communications, data processing, or computer system configurations, including: Internet appliances, hand-held devices (including personal digital assistants (PDAs)), all manner of cellular or mobile phones, wearable computers, embedded systems, vehicle-based computers, multi-processor systems, microprocessor-based or programmable consumer electronics, set-top boxes, network PCs, mini-computers, mainframe computers, and the like. Indeed, the terms "computer," and "mobile device" are generally used interchangeably herein, and refer to any of the above devices and systems, as well as any data processor.

Aspects of the system may be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM or flash semiconductor chips), nanotechnology memory, biological memory, or other data storage media. Alternatively, computer implemented instructions, data structures, screen displays, and other data under aspects of the system may be distributed over the Internet or over other networks (including wireless networks). Those skilled in the relevant art will recognize that portions of the system may reside on a server computer, while corresponding portions reside on a client computer such as a mobile or portable device, and thus, while certain hardware platforms are described herein, aspects of the system are equally applicable to nodes on a network. Aspects of the invention will now be described with reference to the figures.

System Environment

A suitable or representative environment 100 in which the invention may be implemented is provided with reference to FIG. 1. FIG. 1 includes one or more communication networks 150 coupled to various devices capable of storing and running applications as well as communicating on the networks 150. For example, the devices may include a laptop/ultrabook computer 110, a mobile phone 120, a tablet computer 130, a GPS navigation system 140, or other computing or data processing device. The devices 110, 120, 130, 140, can include various input mechanisms (e.g., microphones, keypads/keyboards, and/or touchscreens) to receive user inputs (e.g., voice, text, and/or handwriting inputs). In particular, devices with touchscreens include a virtual keyboard application stored on or accessible via the devices to allow users to enter text by typing or entering text via a virtual keyboard. Devices with traditional twelve key (e.g., 3×4 keypads) may include a T9 predictive text application or a traditional multi-tap (e.g. long press) application stored on or accessible via the devices for text entry. The devices may additionally include an application stored on or accessible by the devices which receives and analyzes text entry on the virtual keyboard and converts numerical text into formatted digit strings.

An application server 160 configured to provide virtual keyboard software and/or digit formatting application software and updates for that software to each of the devices is also illustrated. The virtual keyboard and/or digit formatting software may be stored in an application database 170 coupled to the application server 160. The application server 160 may be coupled to the networks 150 via a wireless or hard-wired connection, such as the Ethernet, IEEE 802.11, or other communication channel known in the art which is formed between the server and the network. Additional details of a mobile device, digit formatting application and corresponding methods are further described with reference to the remaining figures.

Mobile Device

Figure 2:
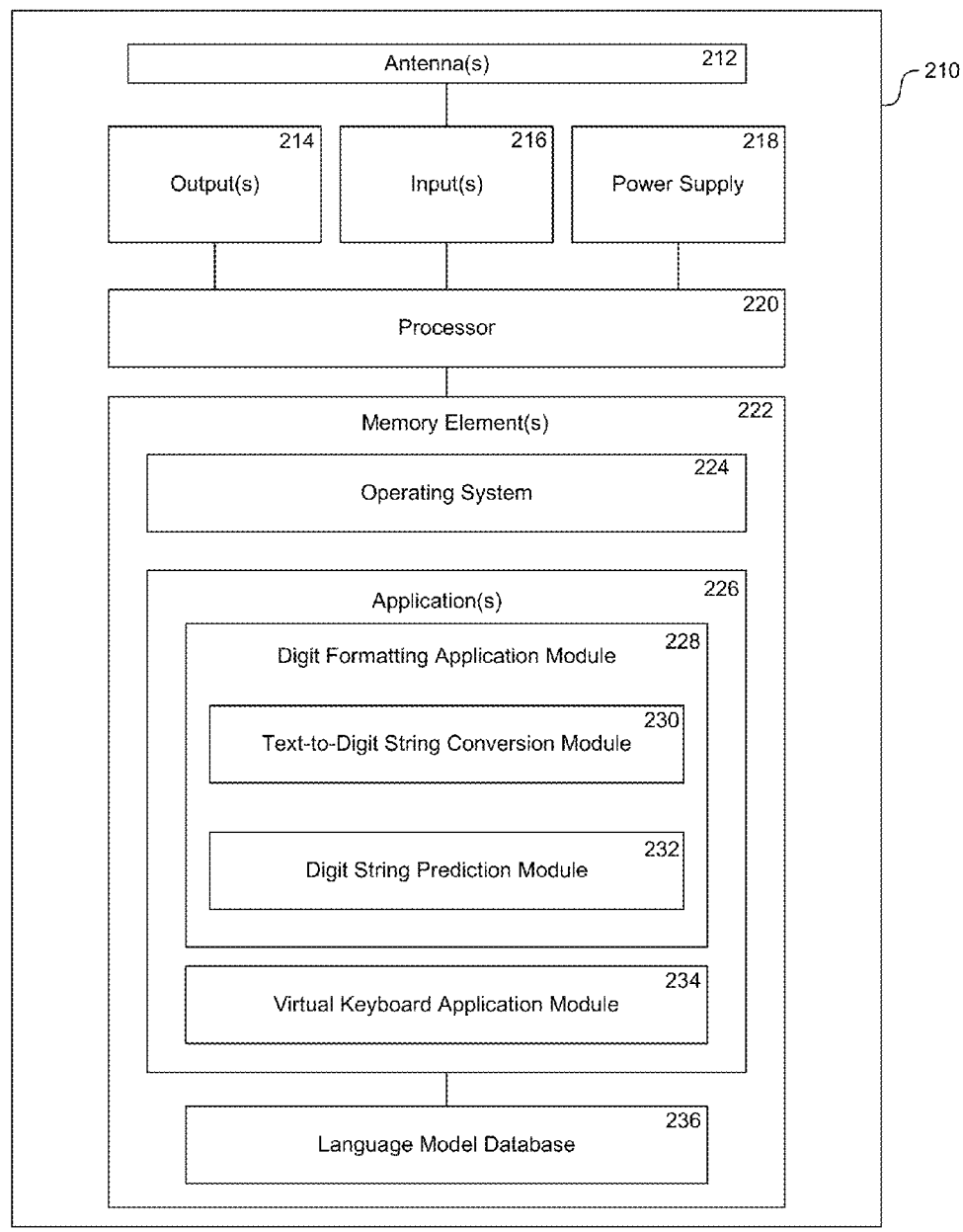
FIG. 2 is a block diagram of example components in a mobile device or suitable computing device capable of providing a virtual keyboard on a touchscreen display.

FIG. 2 illustrates an example of a mobile device having a touchscreen used to implement the methods for formatting digit strings from text strings as provided in the following description. In particular, FIG. 2 illustrates components of a mobile computing device 210 through which text entries may be received from a user. The mobile device 210 is a computing device having a storage medium encoded with instructions capable of being executed by a processor to perform methods disclosed herein based on those instructions. For example, the mobile device 210 may be a smartphone, tablet computer, netbook, mobile GPS navigation device, e-reader, personal wireless device (e.g., mobile hotspot), wearable computer, or any other device which is capable of storing one or more applications and generating a virtual keyboard on a touchscreen display of the mobile device 210 or otherwise receiving text entry on the mobile device 210. While not depicted in FIG. 2, many of the components in the mobile device 210 are also present in other suitable computing devices that implement the disclosed technology. For example, a surface or tabletop computer, desktop computer, server computer, wired phone, or fixed telephone or communications console or apparatus may all have the same or similar components to those depicted in the mobile device 210. Indeed, the present system may be applied to the so-called Internet of things, and thus may be integrated with, e.g., home appliances like refrigerators, washers, dryers, dishwasher, thermostats, home automation systems, home music systems, etc.

The mobile device 210 is configured to input and temporarily store touchscreen or keypad contact events reflecting an interaction on or closely adjacent to a virtual keyboard or numeric keypad on the mobile device 210. Each of the components within the mobile device 210 may be connected, e.g. to a system bus (not shown) capable of transferring data between those components. The mobile device 210 also has a power supply 218, such as a battery, which is capable of providing power to each of the components within the mobile device 210.

The mobile device 210 also includes one or more antennas 212 capable of communicating via radio networks with a cellular communications network (e.g., GSM, CDMA, 3G, 4G), a local wireless area network (WiFi), other devices using near field communication (NFC, RFID) or Bluetooth, and a satellite system (GPS). The antennas 212 may be coupled to a processor 220, which facilitates the sending and receiving of communication signals to/from the aforementioned networks.

Various input components 216 for receiving input signals and various output components 214 are also included in the mobile device 210. For example, the input components may include a touchscreen, keys or buttons, accelerometers, cameras, and a microphone. The output components 214 may include, for example, a speaker and a display. Each of the input components 216 and output components 214 are coupled to a processor 220, which is capable of executing certain functions of the mobile device 210 such as, receiving data from the input components 216, sending data to the output components 214, and storing and retrieving data from the memory elements 222 on the mobile device 210.

The touchscreen, keypad, or other input component 216 provides one or more inputs to the processor 220 such as notifying the processor 220 of inputs, e.g., contact events when the touchscreen is touched or keypad presses on the numerical keypad. The touchscreen may include or communicate with a hardware controller, such as a touchscreen driver, that interprets raw signals received from the touchscreen and transmits information associated with the contact event to the processor 220. The contact event may be generated from, e.g., a finger or stylus touch on a touchscreen which indicates a request by a user to press a virtual key on the virtual keyboard displayed on the device 210. The data characterizing the contact event may include information on the current position of a pointing input device, a surface area (size and/or shape) of the contact points generated by the contact event, a pressure of the contact event, a duration of the contact event, and a location of the contact event (e.g., X-Y coordinates on the display screen of the device or a distance from a predetermined location on the display of the device). Numerous contact events or prolonged contact events (e.g., continuous stroke input over a virtual keyboard) may be interpreted as a text entry.

The processor 220 may be a single processor or multiple specialized processors, such as a digital signal processor (DSP), application/graphics processor, or other types of processor, dependent on the additional components within the mobile device 210. The processor 220 is coupled to one or more memory elements 222 which may include a combination of temporary and/or permanent storage, and both read-only and writable memory, such as static and non-static random access memory (S/RAM), read-only memory (ROM), writable non-volatile memory such as FLASH memory, hard drives, SIM-based components, and other computer readable storage mediums. The processor 220 retrieves and stores data in memory element(s) 222 of the device 210, and executes applications 226 that are stored in the memory elements.

The memory element(s) 222 is/are encoded with various program components or modules, such as an operating system 224, various applications 226, such as those downloaded from an application store or database to the mobile device 210. In particular, the memory elements 222 may include a digit formatting application module 228, or program, for formatting digit strings from text strings received on a virtual keyboard and corresponding program subroutines. Additionally, the memory element 222 may include a virtual keyboard application module 234 for generating a virtual keyboard on the touchscreen of the mobile device 210. The virtual keyboard application module 234 may also be configured to collect the contact event data on the virtual keyboard and interpret the multiple contacts as a text entry. The memory element 222 may also include a digit formatting module 228, which includes a text-to-digit string conversion module 230 and a digit string predication module 232 for predicting a format for the digit string based on the detection of numerical text in a text entry. A language model database 236 may also be included to provide a dictionary including a selection of predictive words used by the text-to-string conversion module 230, where the dictionary may include words from more than one language. The language model database 236 may be updated with additional words, languages and rules.

Though a virtual keyboard is referred to in the following description, it is understood that other forms of text entry, e.g., via a keyboard (Bluetooth or hard-wired), numerical keypad, or other text form entry known within the art, are also considered within the scope of this description. Furthermore, though a mobile device is references in the following embodiments, it is understood that any computing device coupled to an input device capable of receiving a text string is also considered applicable to each embodiment discussed herein.

As discussed herein, the mobile device 210 may include or store a digit formatting application module 228 that detects numerical text in a text string and converts that numerical text into a digit string via a text-to-digit string conversion module 230. The converted digit string may be in raw format, e.g., one or more numbers without punctuation or spacing. The unformatted digit strings may be sent to the digit string prediction module 232 for formatting of the digits. The digits may be then formatted based on various criteria.

A first criteria, for example, may include the context of the one or more words immediately preceding or following the numerical word within the text string. In some embodiments, if the numerical text included in the text string comprises all of that text string, the digit formatting application may additional analyze text strings received prior to the converted digit string (e.g., in a previously received text message, such as one that says "What is your phone number?").

Another criteria which may be considered includes the language of the text entry received on the mobile device 210. For example, if a particular language is detected, then particular modifiers and entry words for formatting the digit strings will vary. The various modifiers (e.g., feminine, masculine, singular, or plural) of the entry or other words within the text be used to format the digit strings. For example, if the user types "Las primeras abogadas . . . ", the system may automatically convert "primeras" to "1as" (e.g., rather than 1o, 1a, 1os). In some embodiments, the system may predict "1as" once the user has typed "Las prime_" based on the "Las" modifier. Additionally, this can occur vice versa so that, when a text string is entered, the system may use the various modifiers of the numerical words to determine proper formats, rules (e.g. grammar rules), and spelling of additional words (e.g., adjectives) in the text string. So, using the aforementioned example, if the user types "Las primeras aboga_. . . " the system may predict "abogadas" from the word "primeras".

The various numerical formats considered may include, for example, specific formats for digits associates with times, dates, global positioning satellite coordinates, monetary amounts, phone numbers, addresses, measurements, quantities, and ordinal numbers, amongst others not listed but within the scope of the present description.

As previously mentioned, the digit formatting application module 228 may be stored in a memory element 222 of the mobile device 210 and may be associated with the virtual keyboard application module 234 such that each time the virtual keyboard application module 234 is called, the digit formatting application module 228 is also called. Accordingly, whenever the virtual keyboard is displayed on the device, the digit formatting application module 228 is executed to analyze text inputs from a user and predict a formatted digit string. It will be appreciated that the digit formatting application module 228 may also be integrated with the virtual keyboard application module 234. Additionally, the text-to-digit string conversion module 230 and/or the digit string prediction module 232 may also, together or separately, be integrated with the virtual keyboard application module 230 or be stand-alone applications.

The virtual keyboard application module 234 causes the device to generate and display a virtual keyboard on a touchscreen input component 216. The keyboard may be a virtual keyboard emulating a physical keyboard, such as a keyboard that is implemented on a touch-sensitive surface, presented on a touch-sensitive display, imprinted on a touch-sensitive surface, and so on. Further details regarding suitable text input applications may be found in commonly-assigned U.S. Pat. No. 7,542,029, issued on Jun. 2, 2009, entitled SYSTEM AND METHOD FOR A USER INTERFACE FOR TEXT EDITING AND MENU SELECTION, which is incorporated by reference in its entirety. Further details regarding technologies that may be suitable for implementing in conjunction with the present invention may be found in commonly-assigned U.S. patent application Ser. No. 13/366,225, filed on Feb. 13, 2012, entitled CORRECTING TYPING MISTAKES BASED ON PROBABILITIES OF INTENDED CONTACT FOR NON-CONTACTED KEYS; commonly-assigned U.S. patent application Ser. No. 12/186,425, filed on Aug. 5, 2008, entitled A PROBABILITY-BASED APPROACH TO RECOGNITION OF USER-ENTERED DATA, commonly assigned U.S. patent application Ser. No. 13/830,674, filed on Mar. 14, 2013, and entitled REDUCING ERROR RATES FOR TOUCH BASED KEYBOARDS, each of which are incorporated by reference in their entirely.

The virtual keyboard application module 234 may also include an event detection component (not shown) to detect when a user interaction has occurred on the mobile device that warrants the use of the virtual keyboard. For example, if the user selects a text entry field in an electronic mail (email) application or selects a form field on a website page, the event detection component detects the user input as an event that requires a keyboard for text entry. The events detected by the event detection component then trigger the virtual keyboard application module 234 to present a virtual keyboard on a touchscreen display of the mobile device 210.

The virtual keyboard application module 234 may be responsible for removing the virtual keyboard from the display once the user has finished a session, i.e., finished a particular entry, as well as changing the size, language and position of the keyboard dependent on the user's preferences and physical position of the mobile device 210. The virtual keyboard application module 234 may also be configured to display various predictive words and formatted digit strings to a user during and/or after received a text entry by that user (as explained below).

The text-to-digit string conversion module 230 detects numerical words within a text string and converts those words into digit strings. The numerical words may include any number, number combination, ordinal number, roman numeral, or other similar number. The text-to-digit string conversion module may parse each word within the text string and match the word or words to a digit string. In some embodiment, as mentioned previously, the digit strings may originally be formatted without punctuation and in a continuous string of digits. In other embodiments, in order to preserve some aspect of the digit formatting, the text-to-string conversion module may include spacing between each digit corresponding to each separate number word typed by the user. For example, if user types "seven fifteen", then the text-to-string conversion module 230 may convert this to "7 15" instead of "715" such that the digit to string prediction module may properly format the word numbers with punctuation between, e.g., the "7" and "1" rather than the "1" and "5" (or may provide both options, so the user may select one, but with "7 15" presented first).

The digit string prediction module 232 receives the outputs from the text-to-digit string conversion module 230. In some embodiments, the digit string conversion module 230 also receives one or more words of the text string within which the digit string is included. In alternative embodiments, the entire text string, including the converted digit string, is received by the digit to string prediction module 232. The digit string prediction module 232 uses the digit string identified by the text-to-string conversion module 230 to predict different formats of digit strings which the user may be attempting to enter or attempted to enter (e.g., after the entire text string is entered). The digit string prediction may occur in real-time or near real-time such that the user may select a format from one or more predictive formats displayed while the user is entering a text string (e.g., text message) on the mobile device. The various possible formats of the digit string are displayed to the user in, e.g., a list, such that the user may then easily select the desired format from the list. The digit formatting application may detect a numerical word entry while the user is typing and predict a format of the digit string prior to the user completing the entry of one or all of the numerical words in that digit string. For example, if the user is typing "It's at s-e-v-e-n t-h-i-r . . . " the digit formatting application may predict "7:30 A, 7:30 P, 7:13 A, 7:13 P" without the user having to enter the remaining letters in the word "t-h-i-r . . . " In some embodiments, the user may continue typing the remaining letters in the numerical word, "t-h-i-r-t-y" and the digit formatting application may automatically complete the digit formatting for the user to indicate "7:30" within that text string. The aforementioned embodiment is further discussed in later sections with reference to FIG. 4.

The device 210 may include other components (not shown) that facilitate operation of the device and its various components, including other input 216 or output 214 components, a radio and/or other communication components, a camera, a subscriber identity module (SIM), and so on. In general, the device 210 may store or contain any and all components, modules, or data files required or used in performing typing corrections, such as by interpretation and word prediction for text input applications provided by the device 210.

Methods for implementing the aforementioned application modules on a device such as illustrated in FIG. 2 are now described. Reference to particular components within that device may be indicated by a numerical identifier corresponding to FIG. 2.

II. Methods

Figure 3:
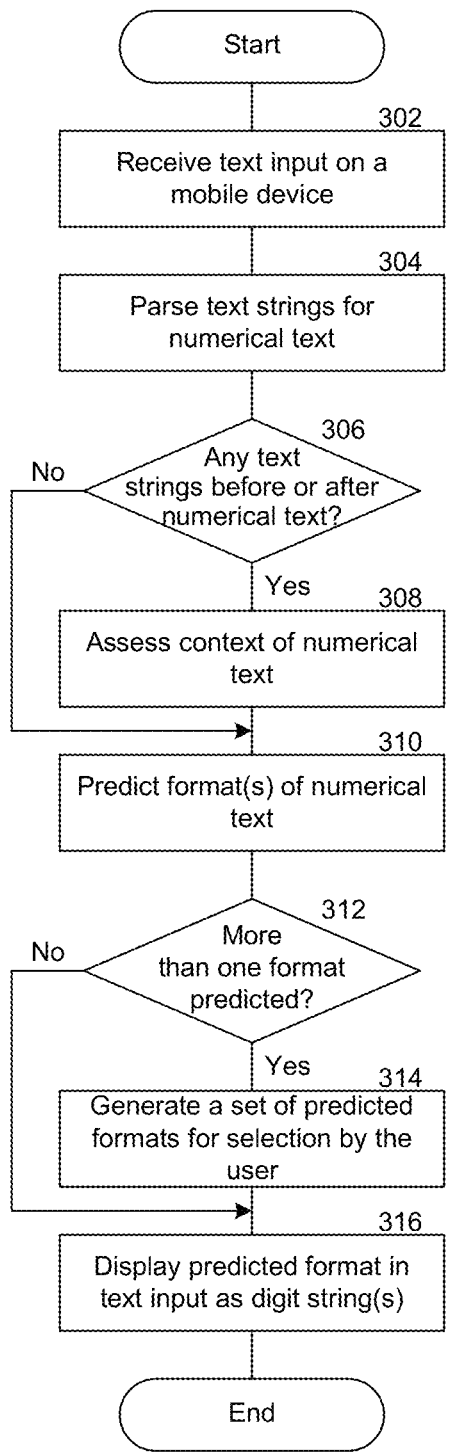
FIG. 3 is a flow diagram illustrating a method for formatting numerical text entry on a keyboard of a mobile device.

FIG. 3 is a flow diagram illustrating the use and implementation of the digit formatting application module 228 (FIG. 2) on a mobile device. In particular, FIG. 3 is a flow chart depicting a method for formatting number words into digit strings from text strings entered on a touchscreen or virtual keyboard of mobile device. The method may additionally include predicting the digit strings in real-time during user entry. The digit strings may include recommended digit formats based on criteria such as, for example, the context in which the digit string is received by a user. Additional criteria may also considered, for example, prior to beginning the method, the language in which the user is typing may be detected. Each language and country of origin for that language may also be considered while performing the step in the method of FIG. 3. For example, Spanish in Mexico differs from Spanish in Argentina. Accordingly, certain words and/or phrases may also differ.

Beginning in step 302, text input, such as text strings, may be received via a virtual keyboard generated for display on the touchscreen of the mobile device. The text input may include multiple contact events detected on the touchscreen of the mobile device. As previously mentioned, contact events may be detected based on known touchscreen techniques, such as using a capacitive, resistive or optical wave touchscreen technology. When multiple contact events are detected on the virtual keyboard of device substantially simultaneously or within a relatively short predetermined time interval, the multiple detected contact events are processed by the virtual keyboard application module to determine one or more words comprising a text string. In some embodiments, one or more additional applications or modules may be stored in the memory of the mobile device and utilized to interpret the text string from the multiple contact events detected on the virtual touchscreen. In certain embodiments, the received contact events may be processed by a word prediction module (not shown) utilizing the language model database to predict the words in the text string and correct any typographical errors received during typing on the virtual keyboard. For example, they system may use existing predictive text input processes to predict that the input text strings "seben", "sevrn", aeven" and the like all correspond to the word "seven".

The virtual keyboard application may be provided by the operating system of the device. The keyboard application may be always running, or "on", in the background of the device and called to the foreground when needed. For example, an application executing on the mobile device may call the virtual keyboard in order for a user to enter text to that application. The virtual keyboard may be called automatically or by user command. As will be appreciated by one skilled in the art, the virtual keyboard may vary in size relative to the display screen size of the mobile device or relative to the size of the window in which the keyboard is viewable by the user. Accordingly, the number of keys displayed on the virtual keyboard may vary and may require navigation to additional views of the keyboard for selection of additional keys, such as keys for numbers and punctuation.

In step 304, the text strings are parsed for numerical text or number words such as, "second" or "three". These numerical text strings may be included in a language model database stored on or accessible by the mobile device such that the user may quickly enter the number words via predictive text entry. This type of language modeling may additionally account for mistakes, e.g., typographical errors, made while the user is entering text, thus providing for more efficient digit input. The digit formatting application may preemptively display digit strings during this step and/or anytime during numerical text entry by the user. However, at this stage of the method, the digit strings may not be formatted properly as each digit may yet to be accounted for. This is especially true if the context in which the numerical text strings are entered does not indicate a particular digit format.

In step 306, the digit formatting application determines if any text strings were entered before or after the numerical text string. By analyzing the preceding and following text, the system may determine a particular format for the series of digits corresponding to the numerical text string. For example, the user may be entering a monetary amount or a weight or other mathematical measurement, coordinates, account number, social security number, etc., and thus the user prefers that the digit string be formatted accordingly.

In step 308, if the system identifies text strings preceding or following the user's input numerical text string, the system analyzed that preceding and/or following text to determine the context in which the numerical text string is utilized. For example, the system any detect numerical text string modifiers, such as "at" or "dollars," which indicate a time or monetary amount as the context in which the numerical text string was entered. This context may then indicate which formatting the digit formatting application utilizes to format the digit string. In some embodiments, if the system determines or infers that the user intends a particular format in which one or more words in the context may also be abbreviated and/or included in the digit string, the digit formatting application may also perform this conversion. For example, and as explained in the steps below, if the user enters "seven pounds" and the system determines the context to be associated with weight, then the digit formatting application may identify the "pounds" as digit format for weight and convert the words "seven" and "pounds" to "7 lbs.", but in the context of money, convert that same text input into "£7".

In step 310, the number words, as determined by the text-to-string conversion module 230, are input into a digit string prediction module 232 (or stand-alone application), which includes a sub-routine that generates one or more predictive digits or digit string formats to be displayed to the user. The individual digits may be displayed to the user during text entry while the formatted digit strings may be displayed as additional number words are detected in the text entry. The partial words, word pair, or long words may be compared with a language model (e.g., an n-gram model with associated probabilities) such as the language model database 236 in FIG. 2, that is stored in a memory element of the mobile device 210. The language model is used to process a received character string based on common use training data associated with the user of the device and/or the general population. The language model may be a shortened version and the predicted number words, corresponding digit strings and the formatted digit strings within that model may include words, number words, and digit string formats commonly used both by the general population as well as specific to the user of the mobile device. For example, based on the population most closely associated with the user, the system may convert "bakers dozen" into "13". Further, the system may employ cultural norms for prediction and disambiguation, e.g. when the context infers a meeting time, and the system predicts both digit strings "7:13" and "7:30", the system selects (or presents first) "7:30" since meetings on the half-hour are a cultural norm in many locations. Indeed, the system may determine the location of the device to assist in determining context, and may thus determine cultural norms associated with the current location when inferring a preferred format for the digit string.

In step 312, the digit formatting application determines if more than one digit string format is determined by the digit string prediction module 234, and then in step 314 the application 228 determines a predicted digit format for the user. In some embodiments, there may be only one possible digit string predicted, in which case that digit string may be used to replace the number word(s) in the text string. Thus, where only one digit string format is predicted, the system automatically replaces the number word(s) in the text string with the digit string.

However, using the previous example, if the user enters "It's at s-e-v-e-n t-h-i-r . . . ", the digit formatting application may predict numerous options for the user to select since it is unknown whether the "t-h-i-r . . . " will be "30" or "13" or whether the time in the predicted format is during the morning or at night. Thus, in step 314, the application determines a list of the possible digit format variations to be presented on the display of the mobile device for user selection. Still referring to the previous example, if the time of day (morning or night) or exact time are unknown while the user is entering text, the digit formatting application may generate each possible variation in a time format, e.g., "7:30 A, 7:30 P, 7:13 A, 7:13 P". But if the context includes words like "dinner", then the system infers 7:13 P, and thus provides the following list "7:30 P, 7:13 P, 7:30 A, 7:13 A". The user may then select which predicted time in the list to select. The user may select the proper digit string via touch on a touchscreen or via keypad entry. The system may then replace the number word(s) within the text string with the user-selected formatted digit string. The digit formatting application may then exit and/or continue if additional text entries are received. The application processes may also end each time the virtual keyboard is removed from the display of the mobile device or each time that an application is closed in which the virtual keyboard (and digit formatting application) is called.

Figure 4:
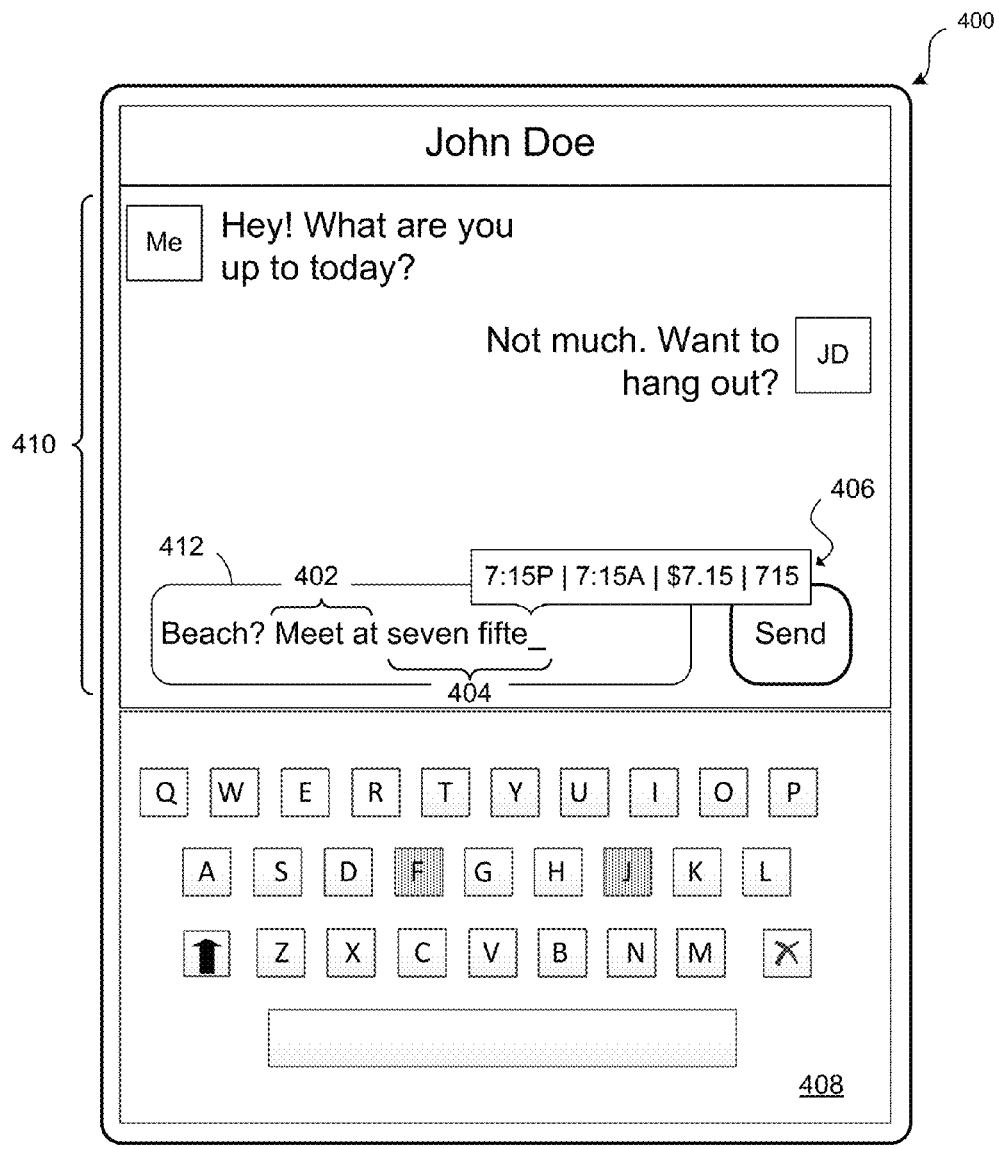
FIG. 4 illustrates a text input on a virtual keyboard displayed on a touchscreen of a mobile device.
Figure 5:
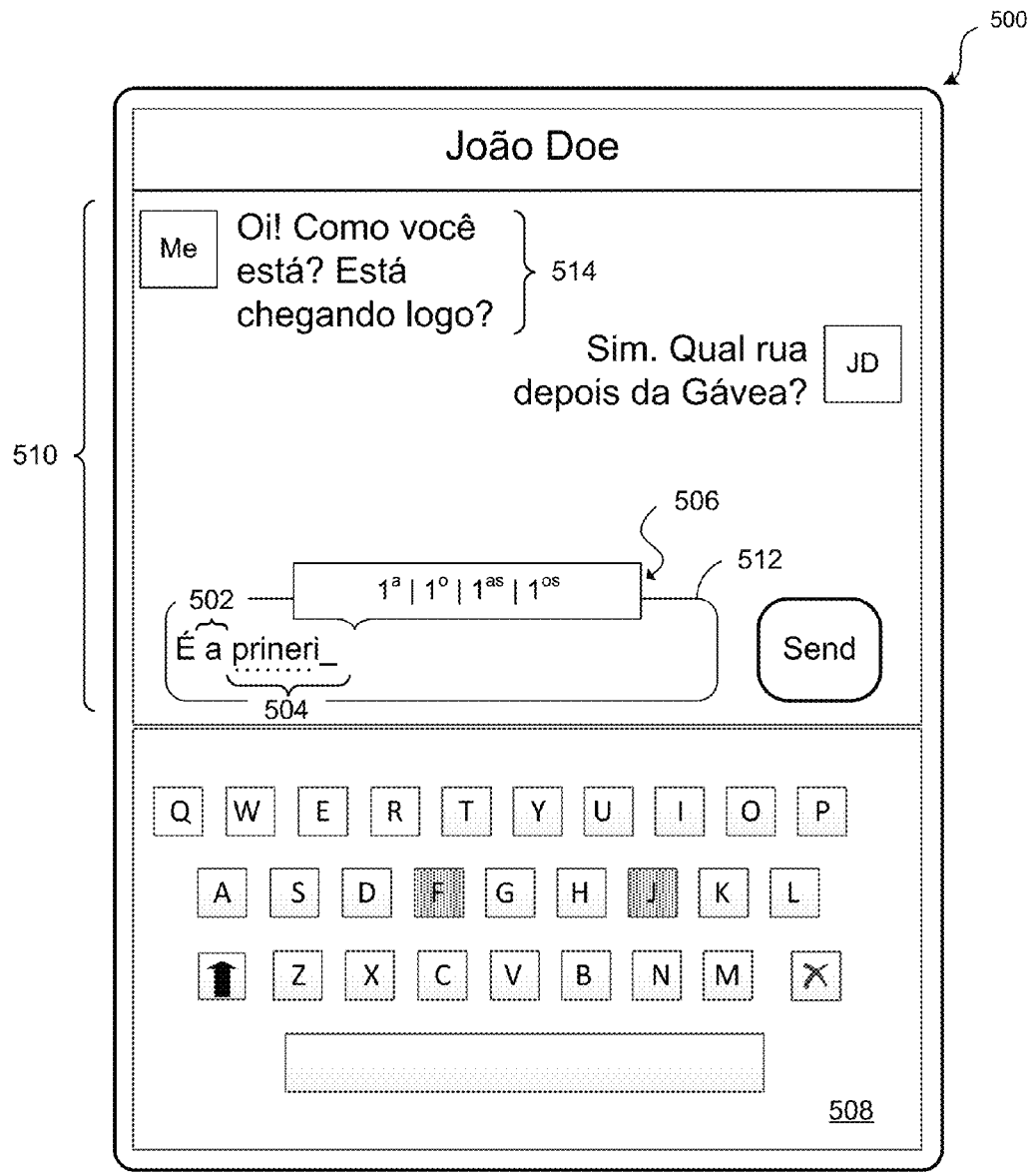
FIG. 5 illustrates a foreign language text input on a virtual keyboard displayed on a touchscreen of a mobile device.

The methods described with reference to FIG. 3 will now be described with reference to corresponding examples. In FIGS. 4-5, embodiments of text entries on virtual keyboards and digit formatting of number words in those text entries are illustrated.

Depicted Embodiments

As discussed above, the disclosed system and methods are directed to detecting a numerical text string, or number word within a text string and converting it into a formatted digit string. The present system and methods considers various criteria for formatting digit strings. For example, the criteria may include the language in which the keyboard is currently set (or in which the user is typing), the context in which the numerical text string is detected, or the formatting of the numerical string within the text string (i.e., the spacing or other separation between number words). The system and methods apply language models in order to provide predictive digit strings and digit string formats commonly used as well as to correct typographical errors while the user is entering text. Each of these various embodiments is addressed in the following examples.

In FIG. 4, an example of a screenshot 400 of a message entry screen on a touchscreen of a mobile device, such as a tablet computer or smartphone, is illustrated. A virtual keyboard 408 is typically displayed on one portion of the display screen, while a text entry field 412 and conversation area 410 is also displayed for the user to view text entries made in the text entry field 412 and prior messages in a conversation (FIG. 4 shows just one of many possible examples).

The virtual keyboard 408 may be a QWERTY keyboard or any other keyboard known and commonly used in the art. The keyboard presented to the user may be based on the language in which the user is entering text or in which the user manually selects. In the embodiment shown in FIG. 4, a home row of keys is located across the middle row of the keyboard, includes two identified home keys "F" and "J" which users of physical keyboards often use as a starting resting location for their index fingers. The keys on the virtual keyboard 408 may vary in size depending on how many keys are displayed on the keyboard and the display size of the mobile device on which the keyboard 408 is provided. For example, depending on the display size of the mobile device, more or less keys may be displayed to the user for text entry. Accordingly, some punctuation and/or numerical keys may also be present. However, in virtual keyboards 408 as well as numerical keypads on cellular telephones, the keys are limited such that users may enter text while touching numerous keys on the keyboard 408 at once. The keyboard, therefore, include numerous views, which may be accessed via a particular key on each view.

In the embodiment shown in FIG. 4, the present system and methods only rely upon an alphabetical view of the keyboard in order to enter a text message that includes a properly formatted digit string. The digit formatting application may receive a text string "Beach? Meet at seven fifte_" in the text entry field 412 via the contact events detected on the virtual keyboard 408. The digit formatting application may first parse the text string for numerical text, e.g., "seven fifte_" 404. In the embodiment illustrated, the user "Me" is clearly typing a time for meeting another person "JD" at the beach.

Because the user typed the word "seven", a space, and the word "fifte_", the system may interpret this as requiring punctuation between the "7" and "15" (as opposed to a space). Accordingly, the system first detects the numerical text "seven" and "fifte_" 404 and converts them to digit strings "7_15". In this example, the system auto-completes the "fifte_" 404 during the conversion process such that the predictive digit strings reflect the completed digit "15" corresponding to the number word.

In order to determine the proper digit format for the numerical text string, the system then may analyze the converted digit string based on the criteria described in the previous paragraphs. For example, the user digit string prediction module included in the digit formatting application may first determine that the language of the text is English. Then, the most commonly used contextual words and phrases may be compared to those in which the numerical string is included. As shown in FIG. 4, the phrase "Meet at" 402 occurs immediately prior to the number words. This phrase may be included in the language model database (in FIG. 2) or in another database associated with the digit formatting application which includes words and phrases corresponding to particular digit formats. For example, within that database the phrase "Meet at" may correspond to a "time format" in "English".

Utilizing the aforementioned time format, the user input is detected as "7:15". However, the system may be unable to detect to which time of day the user "Me" is referring. In some embodiments, the digit formatting application may factor in the current time of day in which the text message is being entered and automatically choose the closest time to that as the preferred format. For example, if the user "Me" is texting at 8:00 A with "JD" in FIG. 4, the digit formatting application may consider this time and automatically select 7:15 P as the preferred format for the digit string.

Whatever the case, with more than one possible predictive format, the system may generate a list 406 of those possible digit strings for the user "Me" to select. For example, the system may list the format with the highest likelihood first, e.g., "7:15 P", while listing the next likeliest digit string of "7:15 A". In a case where the system incorrectly analyzed the user's text entry, the system may also provide additional digit strings in the list 406. For example, "seven fifteen" is also how monetary amounts are expressed in English, so "$7.15" may be listed. The system may also list "715" with no punctuation to provide a verbatim numerical-to-digit string conversion.

FIG. 5 illustrates an example of a screenshot 500 of a message entry screen on a touchscreen of a mobile device is illustrated, similar to FIG. 4. Again, an example of a virtual keyboard 508 is displayed on the lower portion of the touchscreen and a conversation area 510 and text entry field 512 are also provided on an upper portion of the touchscreen.

Referring to FIG. 5, the user "Me" has entered a first message 514 in which the system detects the language of Portuguese. Accordingly, though the user "Me" may have one conversation in English (such as that in FIG. 4), once the user "Me" switches to the conversation shown in FIG. 5, the digit formatting application may automatically switch to Portuguese as the text entry also switches. This switch causes the language model database and corresponding text to digit conversion to change as well. For example, the phrase "Meet me" in English would not correspond to a "time format" in Portuguese and, as such, may cause the wrong digit format to be returned to the user.

The user in FIG. 5 has entered "É a prineri_", in which "prineri_" 504 is indicated as being incorrectly typed via, e.g., an underline (or highlight or other form known in the art). However, based on the text entry, the system may both autocorrect and autocomplete the text to "primeira". The text-to-digit conversion module in the digit formatting application may then determine that the text is a numerical string of "primeira" indicating an ordinal number (i.e., "first").

The system then analyzes the context in which the numerical string is detected. For example, in FIG. 5, the preceding modifier "a" indicates the ordinal number is both feminine and singular. So, the system may then rule out all variations of the digit string for the ordinal number "first", except one. The converted numerical string may then be presented for selection by the user or automatically entered in the text string with "1$^a$", which is the digit string for "primeira" formatted correctly in Portuguese.

In the embodiments illustrated in FIGS. 4-5, the user is able to quickly enter text, including numbers, without having to switch views of the virtual keyboard. Additionally, the user is able to compress message length by including digit strings rather than numerical text within the message and take advantage of the autocorrect and autocomplete features, which are unavailable during numeric key entries (e.g., manual digit string entry on a different view of the keyboard).

Though only two languages are discussed with reference to FIGS. 4-5, it will be appreciated that various languages and scripts may be detected and converted from numerical text into digit strings. The system may automatically employ digit strings that differ from the native language, e.g. using Latin digits when the user is conversing in Arabic. But based on cultural norms or standards inferred among the population used for creating the language model, if the user's language is Tibetan, then the system converts Tibetan text into Tibetan digits.

It will be also appreciated that the techniques disclosed herein associated with a touchscreen may be equally applicable to other touch input technologies such as a touch pad or graphics tablet, as well as to other text-input applications and devices.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein may be applied to other systems, not necessarily the system described above. The elements and acts of the various examples described above may be combined to provide further implementations of the invention.

These and other changes may be made to the invention in light of the above Detailed Description. While the above description describes certain examples of the invention, and describes the best mode contemplated, no matter how detailed the above appears in text, the invention may be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims While certain aspects of the invention are presented below in certain claim forms, the applicant contemplates the various aspects of the invention in any number of claim forms. For example, while only one aspect of the invention is recited as a means-plus-function claim under 35 U.S.C. sec. 112(f), other aspects may likewise be embodied as a means-plus-function claim, or in other forms, such as being embodied in a computer-readable medium. (Any claims intended to be treated under 35 U.S.C. §112(f) will begin with the words "means for", but use of the term "for" in any other context is not intended to invoke treatment under 35 U.S.C. §112(f).) Accordingly, the applicant reserves the right to add additional claims after filing the application to pursue such additional claim forms for other aspects of the invention.

We claim:

1. A method for use by a mobile computing or telecommunications device, for converting text strings input by a user into digit strings, the method comprising:
   receiving from the user at least one text string input from a keyboard of the mobile device,
   wherein the at least one text string includes one or more numerical text strings;
   automatically detecting the one or more numerical text strings within the at least one text string;
   automatically converting the one or more numerical text strings into one or more digit strings;
   identifying a keyword or keyword phrase proximate to the one or more digit strings within the one or more numerical text strings; and
   formatting the one or more digit strings based on the identified keyword or keyword phrase.

2. The method of claim 1, further comprising:
   predicting multiple formats for the one or more digit strings; and
   presenting the multiple formats to the user for selection of one format;
   wherein at least one of the multiple formats includes punctuation added to a digit string, a specific spacing between numerals of a digit string, or symbols added to a digit string.

3. The method of claim 1, further comprising:
   determining a time of day at which the at least one text string was received from the user;
   automatically determining a language associated with the text string;
   determining a location of the mobile device; and
   formatting the one or more digit strings based on the determined time of day, the determined language, and the determined location of the mobile device.

4. The method of claim 1, further comprising automatically replacing the detected one or more numerical text strings with the digit strings in real-time or near real-time.

5. The method of claim 1, wherein the keyboard is a virtual keyboard generated on a touchscreen of the mobile device.

6. The method of claim 1, wherein the keyboard is a virtual keyboard generated on a touchscreen of the mobile device, and wherein the keyboard is a QWERTY keyboard which displays multiple views, and wherein alphabetical keys are displayed in a separate view from the numerical keys.

7. At least one machine-readable storage medium, excluding a transitory propagating signal, and containing a set of instructions, which when executed by one or more processors, cause a data processor to:
   automatically detect at least two number words from a user-input set of text;
   convert the detected number words into a digit string;
   analyze context associated with the detected number words;
   automatically modify a format of the digit string based on the analyzed context,
      wherein automatically modifying a format of the digit string includes adding at least a punctuation character, a symbol character, or a space to the digit string based on the analyzed context associated with the detected number words.

8. The machine-readable storage medium of claim 7, wherein the set of instructions are stored on a portable data processing device, and wherein the user-input set of text is received via a virtual keyboard generated on a touchscreen of the device.

9. The machine-readable storage medium of claim 7, further comprising presenting a list of multiple, different formats for the digit string, wherein a first entry in the list is inferred to be most probable based on the analyzed context.

10. The machine-readable storage medium of claim 9, further comprising predicting the list of multiple, different formats based on two or more characters entered in each of the detected number words.

11. The machine-readable storage medium of claim 9, automatically replacing the detected number words with the digit strings in real-time or near real-time, or replacing the detected number words upon selection of one format for the digit string in the list.

12. The machine-readable storage medium of claim 7, wherein analyzing the context includes identifying a keyword or a keyword phrase adjacent to the one or more number words, wherein the keyword or the keyword phrase corresponds to a particular format to be applied to the digit strings.

13. The machine-readable storage medium of claim 7, wherein analyzing the context includes: determining a time of day, automatically determining a language associated with the text string, or determining a location of the device.

14. The machine-readable storage medium of claim 7, wherein the keyboard is a virtual keyboard generated on a touchscreen of the device.

15. A system for converting text to digits, comprising:
at least one processor and memory;
a text-to-digit convertor configured to;
automatically detect at least two number words from a user-input set of text, and
convert the detected number words into an unformatted digit string; and
a digit formatting module configured to modify the unformatted digit string into a formatted digit string based on one or more keywords adjacent to the at least two number words from the set of text.

16. The system of claim 15, further comprising a portable power source, a touchscreen, and a housing for carrying the processor, memory, power source and touchscreen, wherein the system is sized to be handheld or worn by a user, and wherein the processor is coupled among the memory, power source and touchscreen.

17. The system of claim 16, further comprising a means for receiving the user-input set of text, wherein the means includes a virtual keyboard generated on the touchscreen.

18. The system of claim 16, wherein the user-input set of text is part of a text message entered by a user into a messaging application, and wherein the digit formatting module is further configured to:
identify one or more keywords within a previous message received by the messaging application; and
modify the unformatted digit string into the formatted digit string based on the identified one or more keywords within the previous message.

19. The system of claim 16, wherein the digit formatting module is further configured to:
identify a time of day at which the user-input set of text was received; and
modify the unformatted digit string into the formatted digit string based on the identified time of day.

20. The system of claim 16, wherein the digit formatting module is further configured to:
identify a current location of a mobile device that includes the system; and
modify the unformatted digit string into the formatted digit string based on the identified current location.

* * * * *